United States Patent [19]
Hendrickson et al.

[11] 3,898,913
[45] Aug. 12, 1975

[54] SOLENOID CONTROL VALVE FOR HYDRAULIC BRAKE BOOSTER

[75] Inventors: Richard T. Hendrickson; Richard L. Lewis; Jerome T. Ewald; Lloyd G. Bach; George B. Hickner, all of South Bend, Ind.

[73] Assignee: The Bendix Corporation, South Bend, Ind.

[22] Filed: Sept. 24, 1973

[21] Appl. No.: 400,464

[52] U.S. Cl. .......................... 91/31; 91/32; 91/433; 91/448; 91/459
[51] Int. Cl.² ............... F15B 13/044; F15B 13/04; F15B 11/10
[58] Field of Search ...................... 91/32, 33, 31, 6

[56] References Cited
UNITED STATES PATENTS

| | | | |
|---|---|---|---|
| 2,619,794 | 12/1952 | Lombard | 91/32 |
| 3,633,363 | 1/1972 | Larsen | 91/6 |
| 3,712,176 | 1/1973 | Meyers | 91/6 |

*Primary Examiner*—Paul E. Maslousky
*Attorney, Agent, or Firm*—Ken C. Decker; William N. Antonis

[57] ABSTRACT

An electrically actuated hydraulic brake booster is disclosed which is adapted for use with an automatic brake control system having a device for sensing the distance and relative velocity between vehicles and for automatically actuating the brakes of the vehicle when the automatic control system senses a relative velocity and distance which indicates that a collision is imminent. The electrically actuated brake booster includes a solenoid-operated spool valve which operates in series with the spool valve in the brake booster. The solenoid-actuated valve, when actuated, terminates communication between the booster pressure chamber and pump return, and initiates communication between the booster chamber and the pump outlet. One embodiment of the invention uses a proportional solenoid valve, which exerts a force on the spool valve in proportion to the electrical current transmitted to the solenoid. A second embodiment of the invention uses a two-position solenoid valve to control the spool valve and a second normally open solenoid valve to close a supplemental passage between the solenoid-operated spool valve and the booster pressure chamber. Actuation of the solenoid controlling the spool valve causes a fast brake pressure build rate and actuation of both solenoids causes a slow build up in brake pressure.

5 Claims, 2 Drawing Figures

SOLENOID CONTROL VALVE FOR HYDRAULIC BRAKE BOOSTER

BACKGROUND OF THE INVENTION

This invention relates to a solenoid-controlled hydraulic brake booster which automatically applies the brakes of the vehicle in response to a signal generated, for example, by a radar unit which senses an incipient collision between the vehicle and an object and generates a signal controlling the booster in response thereto.

Although many types of automatic vehicle control systems have been proposed, they have not enjoyed widespread use, because of their complexity and relatively high cost. However, recent developments in electronic technology have made such a system practical, and increasing emphasis by the public and the government on vehicle safety has made their use more likely in the future. A typical system uses a radar unit to detect the range and relative velocity between the controlled vehicle and obstacles or other vehicles in the controlled vehicle's path, and generates signals which are adapted to actuate the controlled vehicle's brakes accordingly. Two of these systems are disclosed in U.S. Pat. No. 3,659,293, and U.S. Pat. Application No. 293,301, filed Sept. 25, 1972, both of which are owned by the assignee of the present invention and are incorporated herein by reference. Either of the systems disclosed in the aforementioned patent and patent application are suitable for use with either of the devices disclosed herein.

SUMMARY OF THE INVENTION

Therefore, an important object of our invention is to provide a solenoid-actuated hydraulic brake booster which can be used in conjunction with an automatic vehicle control system to apply the brakes of the vehicle automatically when a collision between the controlled vehicle and obstacles is imminent.

Another important object of our invention is to provide a solenoid actuator for a conventional hydraulic brake booster.

Still another important object of our invention is to provide a solenoid actuator for a hydraulic brake booster which is responsive to the magnitude of the signals generated by the automatic control system to apply the brakes of the vehicle proportionally.

Still another important object of our invention is to provide a solenoid-actuated hydraulic brake booster which includes a pair of solenoids which applies the brakes of the vehicle at two different rates, depending upon the signal generated from the control unit.

DETAILED DESCRIPTION

Figure 1:
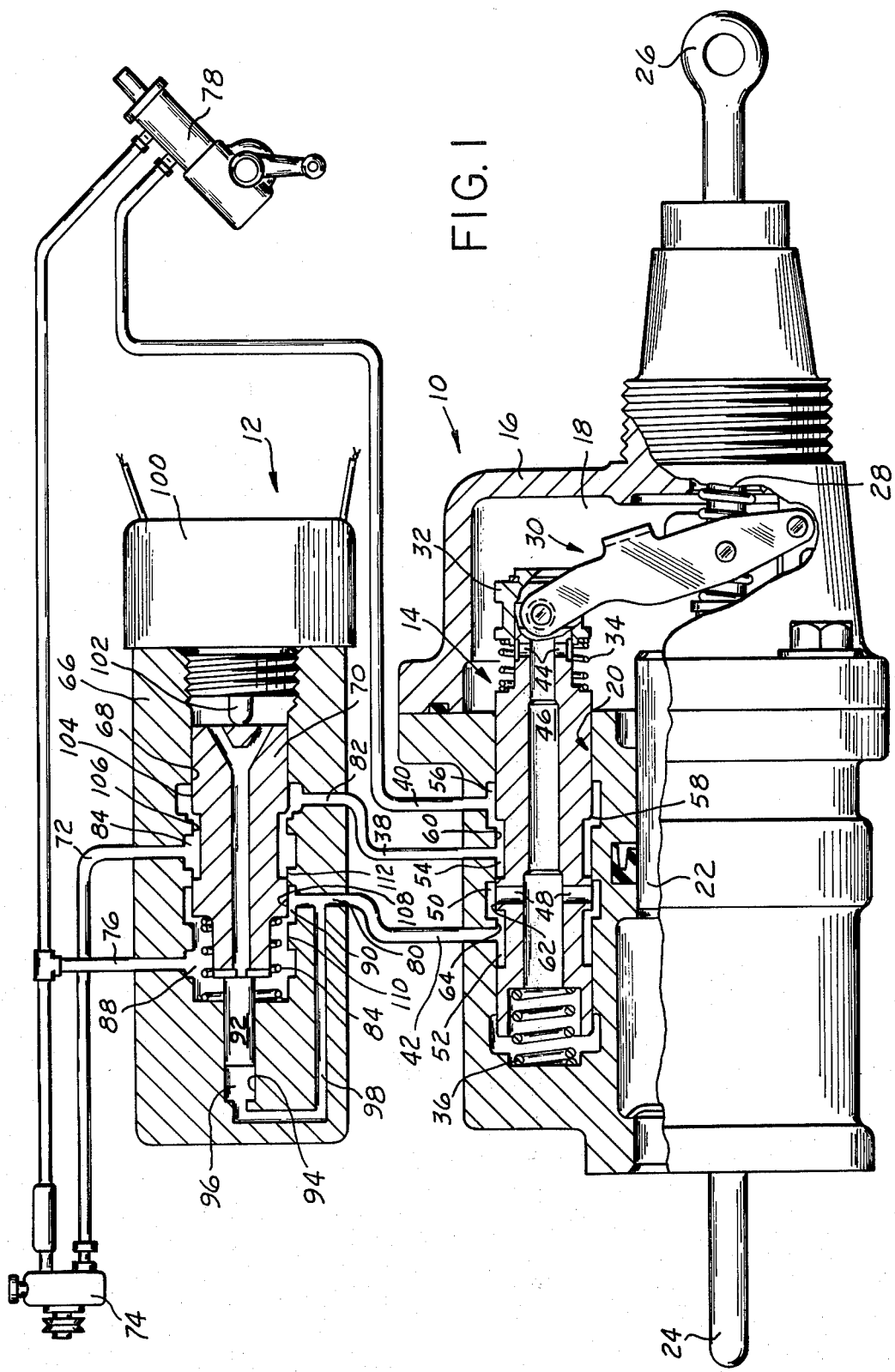
FIG. 1 is a schematic illustration of a vehicle hydraulic system with a solenoid-actuated brake booster made pursuant to the teachings of our present invention illustrated in cross section.

Referring now to the drawings, a brake booster generally indicated by the numeral 10 is provided with a solenoid-actuated control valve 12 which operates in parallel to the spool valve 14 which controls fluid communication into the booster 10. The booster 10 includes a housing 16 defining a pressure chamber 18 therewithin, and a bore 20 which slidably supports the spool valve 14. One end of a piston 22 is exposed to the fluid pressure level in the pressure chamber 18, and is responsive to the pressure level therein to move to the left viewing FIG. 1 during a brake actuation. A rod 24 interconnects the piston 22 with a standard automotive master cylinder (not shown), which is mounted just to the left of the housing 16. The movement of the piston 22 to the left viewing FIG. 1 is transmitted to the master cylinder by the rod 24 to generate master cylinder pressure in the normal manner well known to those skilled in the art.

One end 26 of operator-actuated input rod 28 is connected to the conventional brake pedal (not shown) mounted on the vehicle operator's compartment. Lever mechanisms generally indicated by the numeral 30 interconnect the rod 28 with a cap 32 slidably mounted on the end of the spool valve 14 disposed in the pressure chamber 18. A spring 34 is sufficiently strong that during normal actuation the cap 32 does not move relative to the spool valve 14 and therefore movement of the input rod 28 is transmitted through the lever mechanisms 30 to shift the spool valve 14 to the left viewing FIG. 1. Details of the construction and operation of the lever mechanism 30 are disclosed in U.S. Pat. No. 3,603,209 owned by the assignee of the present invention and incorporated herein by reference. Similarly, the structure operation of the secondary valve or cap 32 on the spool valve 14 is disclosed in U.S. Pat. No. 3,677,140, also owned by the assignee of the present invention and incorporated herein by reference. Another spring 36 acts against the left hand end of the spool valve 14 to urge the lever to the brake-released position illustrated in the drawing. The spool valve 14 is adapted to control fluid communication between the booster inlet port 38, the outlet port 40, the return or exhaust port 42, and the booster pressure chamber 18. In the position illustrated in the drawing, the pressure chamber 18 is vented to the return port 42 through passages 44, 46 and 48 within the spool valve 14, and through groove 50 in the bore 20 and groove 52 on the outer circumferential surface of the spool valve 14. Similarly, substantially uninhibited fluid communication is permitted between the inlet port 38 and the outlet port 40 through groove 54 in the spool valve 14 and groove 56 in the wall of the bore 20. When a brake application is effected, spool valve 14 is shifted to the left viewing FIG. 1, thereby decreasing the size of the passage defined between land 58 of spool valve 14 and land 60 on the wall of the bore 20, thereby restricting fluid communication between the grooves 54 and 56 to develop a higher fluid pressure level in the groove 54. However, a chamfer (not shown) on the land 58 prevents fluid communication from ever being entirely terminated between the groove 54 and the groove 56. At the same time, land 62 closes with land 64 to thereby terminate fluid communication to the port 42. At the same time, of course, land 62 moves away from the land 60, to thereby initiate fluid communication between the grooves 54 and 50, and therefore from the groove 54 into the pressure chamber 18, where the fluid reacts on the right hand end of the piston 22 to effect a brake application. On release of the brakes, spring 36 drives the spool valve 14 to the position illustrated in the drawing.

The automatic control systems disclosed in the aforementioned patent and patent application are designed to communicate pressurized fluid to chamber 18 even in the absence of actuation of the valve 14 by the driver of the vehicle. The valve 12 includes a housing 66 defining a bore 68 therewithin which slidably supports a valve spool 70. Housing 66 is provided with a first port 72 which is connected to the outlet or high pressure side of the vehicle power steering pump 74, and a second port 76 which is connected with the inlet or low pressure side of the pump 74 and with the outlet or low pressure side of the vehicle's power steering gear 78. The inlet of gear 78 is connected to the outlet port 40 of the booster 10. A third port 80 connects the bore 68 with the return 42 of the booster 10, and a fourth port 82 connects the bore 68 with the inlet 38 of the booster 10. A spring 84 yieldably urges the valve spool 70 toward the normal or brake-released position illustrated in the drawing. In this position, the port 72 is communicated to the port 82 through grooves 84 and 86. Similarly, port 76 is communicated to port 80 through grooves 88 and 90. A reaction plunger 92 is slidably mounted in reduced diameter portion 94 of the bore 68, and cooperates with the end thereof to define a reaction chamber 96 therebetween. A passage 98 communicates the reaction chamber 96 with the port 80. A proportional solenoid 100, of the type well known to those skilled in the art, is mounted in the right hand end of the housing 66, the plunger 102 of which is engaged with the right hand end of the valve spool 70. The solenoid 100 is of a type well known to those skilled in the art which exerts a force urging the plunger 102 to the left which is proportional to current transmitted to the solenoid. This current will be dependent upon the strength of the signal developed in the aforementioned electronic control system. Actuation of the solenoid 100 drives the valve spool 70 to the left of the Figure, thereby reducing the size of the orifice defined between lands 104 and 106 so that fluid communication between the grooves 84 and 86 is restricted, to thereby develop fluid pressure in the groove 84. At the same time land 108 is driven into sealing engagement with the land 110, to thereby terminate communication between the port 76 and 80. Of course, at the same time the land 108 is moved away from the land 112, to thereby permit the fluid pressure developed in the groove 84 to communicate into the groove 90, and therefore into the booster pressure chamber 18 through the port 80 and 42, grooves 50 and 52, and the passages 48, 46 and 44. Fluid pressure in the pressure chamber 18 will actuate the booster in the normal manner, as described hereinabove. Fluid pressure in the groove 90, which is the same as fluid pressure communicated into the pressure chamber 18 upon actuation of the solenoid 100, is also communicated into the reaction chamber 96 through the passages 98, where it reacts upon the reaction piston 92 to apply a force opposing movement of the valve spool 70. When the force exerted on the reaction piston 92 equals the force exerted by the plunger of the solenoid 100, the valve spool will stabilize in some position communicating a predetermined amount of fluid pressure into the pressure chamber 18. Of course, the fluid pressure level communicated into the pressure 18 will depend upon the distance that the spool valve 70 has moved to the left, since the fluid pressure level developed in the groove 84 is dependent upon the size of the orifice defined between the lands 104 and 106. However, a small chamfer (not shown) on the land 104 always permits a very minimum level of fluid communication from the groove 84 into the groove 86 even if the solenoid plunger 102 urges the valve spool 70 to its fully actuated position. When the solenoid 100 is deenergized, the spring 84 drives the valve spool 70 into the position illustrated in the drawings, wherein the pressure chamber 18 is again vented to the port 76 and unrestricted fluid communication is permitted between the grooves 84 and 86.

DETAILED DESCRIPTION OF THE ALTERNATE EMBODIMENT

Figure 2:
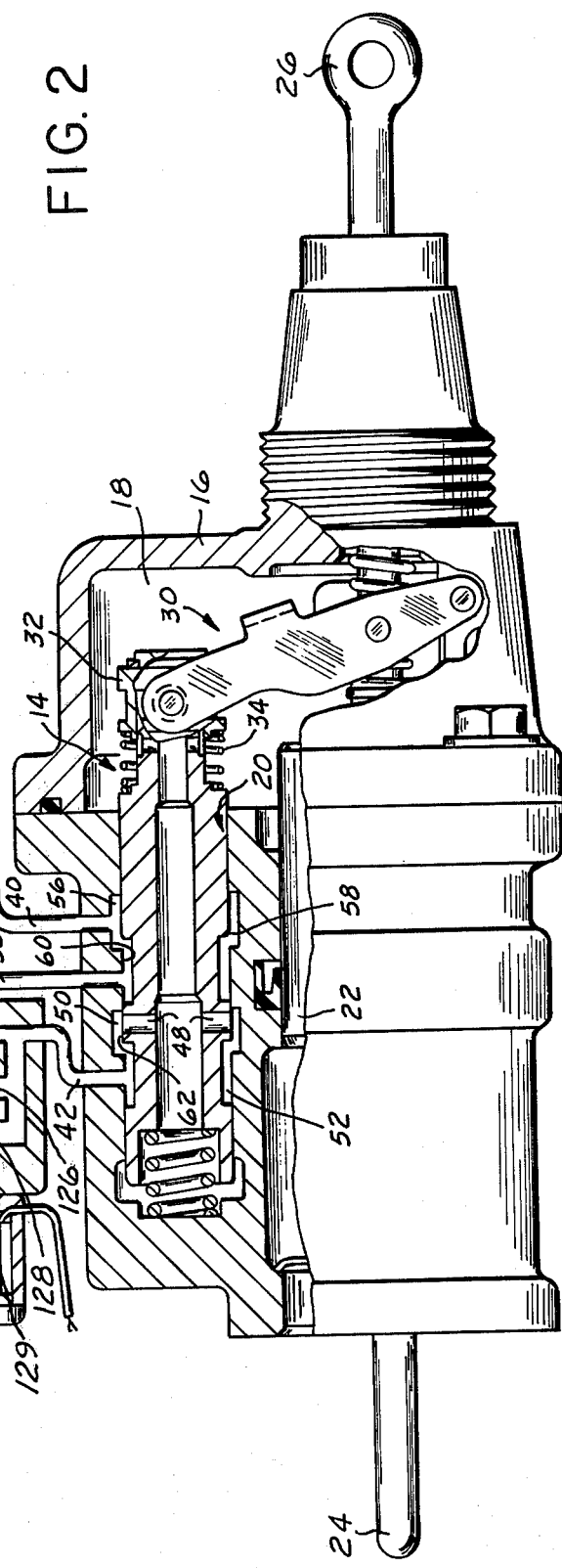
FIG. 2 is an illustration similar to FIG. 1 but disclosing a different embodiment of our invention.

Referring now to the embodiment of FIG. 2, elements substantially the same as those in the preferred embodiment retain the same reference character. In the embodiment of FIG. 2, the proportional solenoid 100 used in the embodiment of FIG. 1 is replaced by another solenoid 114 in which the plunger 102 is moved instantaneously from the released position illustrated in the drawings to the fully applied position when the coil of the solenoid is energized. In the fully applied position, the valve spool 70 is driven to the left, viewing the FIG. 2, until the end 116 of the valve spool 70 bottoms out on the end 118 of the bore 68. In this position, the orifice communicating the groove 84 with the groove 86 is restricted the maximum amount, so that the pressure level developed in the groove 84 is at a maximum. Of course, fluid communication between the grooves 84 and 86 is never completely terminated, since the aforementioned chamfer permits at all times a limited fluid communication therebetween. This maximum fluid pressure level developed in the groove 84 is communicated to the port 80. Port 80 includes a first passage 120 which is provided with a check valve 122 which permits communication from the port 42 to the port 80, but prevents fluid communication in the reverse direction. A second passage 124 parallels the passage 120 and is provided with a restriction 126 therein which provides limited fluid communication through the passage 124. A third passage 128 is provided which parallels the passages 120 and 124. A normally open solenoid valve generally indicated by the numeral 130 includes an armature 131 which controls communication through the passage 128 between the upper portion 127 and lower portion 129 thereof. The solenoid of 130 is responsive to a second output signal from the aforementioned electronic controller to close when the first and second signals are generated simultaneously, and opens when the second signal terminates. Therefore, when the valve spool 70 is initially actuated by the solenoid 114, braking pressure in the pressure chamber 18 will increase at a rate governed by the size of the restriction 126. However, when the controller senses an even more serious collision danger, the controller terminates the second signal to open passage 128, to permit unrestricted fluid communication around the restriction 126. The pressure in pressure chamber 18 is therefore increased to the maximum permitted value, thereby applying the vehicle's brakes very abruptly to avoid a collision. When the solenoids 130 and 114 are deenergized, fluid communicates from the return 42 to the inlet of the pump through the check valve 122, and the grooves 90 and 88 to the port 76.

We claim:

1. A vehicle hydraulic system comprising a pump, a hydraulic booster including a housing having an inlet port, an outlet port, and a return port, said housing defining a pressure chamber therewithin, operator-operated valve means shiftable from a first position communicating said pressure chamber with the return port and permitting substantially uninhibited fluid communication between the inlet port and the outlet port, said operator-operated valve means being shiftable to a second position when a booster actuation is effected wherein communication between the pressure chamber and said return port is terminated and the fluid pressure at the inlet port is communicated into the pressure chamber to actuate said booster, electrically operated valve means having a first port, first passage means communicating said first port to the low pressure side of said pump, a second port, second passage means communicating said second port to said return port, a third port, third passage means communicating the third port to said inlet port, a fourth port, fourth passage means communicating said fourth port to the high pressure side of said pump, said electrically operated valve means being responsive to a signal to shift from a first position communicating said first port with said second port and said third port with with fourth port to a second position restricting communication between said third and fourth ports, blocking said first port, and communicating said second port with the fluid pressure level at said fourth port.

2. The invention of claim 1:
said second passage means including means restricting fluid communication into said return port, said passage means permitting unrestricted communication from said return port.

3. The invention of claim 2:
said second passage means further including a bypass around said restricting means, and a second electrically actuated valve means controlling communication through said bypass.

4. The invention of claim 1:
said electrically operated valve means including a valve element shiftable between said first and second positions, the back pressure developed in said system increasing as said valve element is shifted through intermediate positions between said first and second positions, and a solenoid for shifting said valve element, said solenoid being responsive to the value of said signal to shift said valve elements to a position in accordance with the value of said signal.

5. The invention of claim 4:
said solenoid including an rod engaging said valve element; and
a feedback piston slidable relative to said valve element, one end of said feedback piston being adapted to engage said valve element, the other end of said feedback piston being exposed to the fluid pressure level communicated into said pressure chamber.

* * * * *